United States Patent [19]

Lehmann

[11] Patent Number: 4,805,558
[45] Date of Patent: Feb. 21, 1989

[54] ELECTRIC COW TRAINER

[76] Inventor: Donald E. Lehmann, Rte. 1, Hillman, Minn. 56338

[21] Appl. No.: 45,533

[22] Filed: May 4, 1987

[51] Int. Cl.⁴ .................................................. A01K 15/02
[52] U.S. Cl. ........................................... 119/29; 119/27
[58] Field of Search .................................... 119/29, 27

[56] References Cited

U.S. PATENT DOCUMENTS

| | | | |
|---|---|---|---|
| 1,013,447 | 1/1912 | Root | 119/27 |
| 1,797,159 | 3/1931 | Shafer | 119/27 |
| 2,601,845 | 7/1952 | Youngman | 119/27 |
| 2,637,962 | 5/1953 | Reeve | 54/84 |
| 3,038,444 | 6/1962 | Roth | 119/27 |
| 3,043,266 | 7/1962 | Olscheske | 119/27 |
| 3,572,294 | 3/1971 | Baker | 119/27 |
| 3,955,535 | 5/1976 | Stock | 119/27 |
| 4,134,363 | 1/1979 | Stock | 119/27 |
| 4,241,699 | 12/1980 | Orchard | 119/27 |
| 4,508,059 | 4/1985 | Anderson | 119/27 |

*Primary Examiner*—Robert P. Swiatek
*Assistant Examiner*—Mary E. McNeil
*Attorney, Agent, or Firm*—Orrin M. Haugen; Thomas J. Nikolai; Frederick W. Niebuhr

[57] ABSTRACT

An improved electric cow trainer having a plurality of training members, each associated with a separate animal stall, is described. The design of the present invention permits all of the training members to be simultaneously rotated between their operating position just above the backs of the cows when they are standing in the stall to a second, elevated position well above the heads of people working in the barn. In this second position, the training members are neither a nuisance or dangerous to those working in the barn.

6 Claims, 1 Drawing Sheet

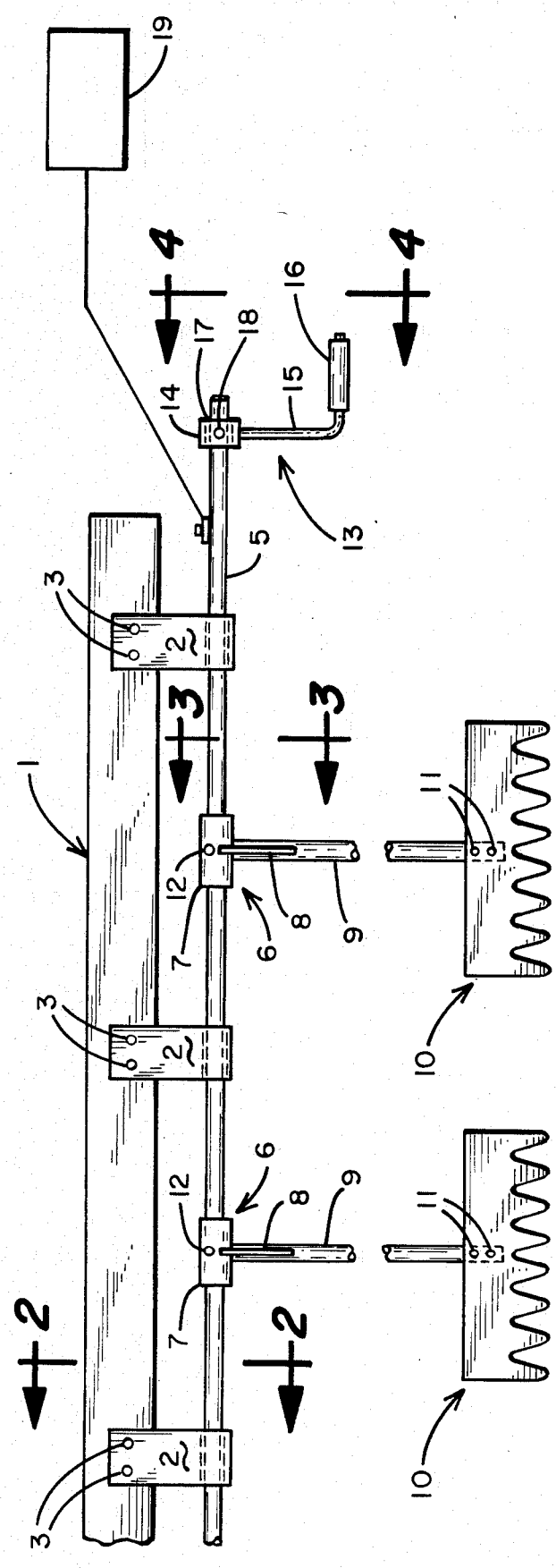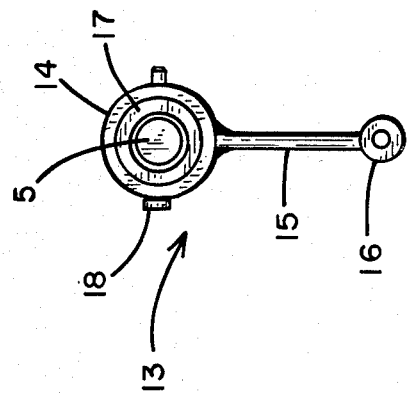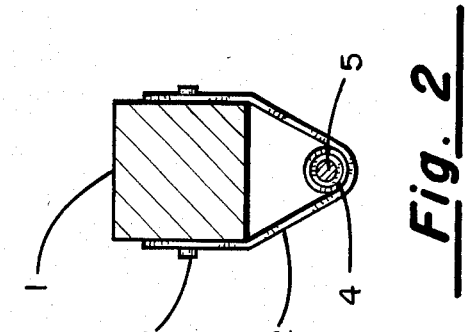

ELECTRIC COW TRAINER

BACKGROUND OF THE INVENTION

This invention relates generally to electric cow trainers used in dairy barns and, more specifically, to an apparatus which permits a plurality of such cow trainers to be rotated into or out of positions simultaneously.

In the dairy industry, it is generally known that what is commonly referred as a "cow trainer" can be employed to prevent cows, and the like, from arching their backs when they are excreting waste. Such devices have been found desirable to use because in the conventional dairy barn arrangement, dairy cows are restrained in staucheons a specific relationship with respect to a waste carrying trough or gutter that runs along a row of stalls. If the cows arch their back and move their hind legs forward when excreting waste, the waste falls onto the floor of the stall rather than into the trough or gutter. The presence of such waste in the stall can eventually soil the cow and/or create a slippery, unsafe footing for the dairy farmer.

The conventional arrangement of these animal training devices is described in U.S. Pat. No. 3,955,535 which issued on May 11, 1986 to Erwald E. Stock. Typically, these animal training devices include an electrically conductive device suspended from an electrically conductive wire. The height of the device is adjusted so that it is a few inches above the cow's back. When properly positioned, the device will only impart an electrical shock to the cow when the cow arches its back.

A problem with conventional cow trainers is that they get in the way of people working in the dairy barn. If the trainers are not energized, this can be a nuisance. If the trainers are energized, they will impart an electrical shock to any person who comes into contact with them.

SUMMARY OF THE INVENTION

It is an object of the present invention to provide a means for rotating a plurality of electrical cow trainers into or out of position simultaneously.

More specifically, it is an object of this present invention to simultaneously rotate a plurality of cow trainers from a first position several inches above the back of the cows to a second position where the lower most portion of the cow trainers is well above the heads of people working in a dairy barn.

These and other objects are achieved according to the present invention by providing an apparatus comprised of (1) a row of spaced apart V-shaped brackets suspended from the roof of the barn in an alignment roughly parallel to the stalls below, (2) a metal shaft which is supported by the V-shape brackets and spans all of the parallel positioned stalls, (3) means for electrically insulating the brackets from the metal shaft, (4) a plurality of cow trainers secured both mechanically and electrically to the metal shaft, (5) a handle for rotating the shaft, and (6) means for energizing the metal shaft and the cow trainers coupled thereto.

These together with other objects and advantages which will become subsequently apparent reside in the details of the construction and operation as more fully hereinafter described and claimed, referenced being had to the accompanying drawings forming a part hereof, wherein like numerals refer to like parts throughout.

BRIEF DESCRIPTION OF THE DRAWINGS

FIG. 1 is a front view of a portion of the cow trainer assembly of the present invention.

FIG. 2 is a cross-sectional view through line 2—2 of FIG. 1 showing one of the brackets used to suspend the shaft of the cow trainer from the ceiling and the means by which the bracket is electrically insulated from the shaft.

FIG. 3 is a cross-sectional view through line 3—3 of FIG. 1 showing the means by which the individual cow trainers are mechanically and electrically secured to the shaft.

FIG. 4 is a cross-sectional view through line 4—4 of FIG. 1 showing the handle; the metal shaft, and means by which the handle may be electrically insulated from the metal shaft.

DESCRIPTION OF THE PREFERRED EMBODIMENT

Referring now, more particularly, to FIG. 1 of the drawings, a portion of the apparatus of the present invention is illustrated wherein a plurality of cow trainers 10 are shown. Each of the cow trainers 10 is associated with an individual stall in which a cow may be kept.

The apparatus of the present invention is intended to be supported by and suspended from an overhead support beam 1 of the barn. The apparatus includes two or more essentially V-shaped brackets 2 which are secured to the overhead beam 1 by an attachment means 3. Those skilled in the art will recognize that a number of different attachment means could be used to secure the brackets to the beam 1 including wood screws, nuts and bolts, nails, or even pegs.

The brackets 2 can be made either of an electrically insulative material such as a plastic, or can be made out of metal. As shown in FIG. 2, when the brackets are made out of metal it is necessary for the brackets to include a cylindrical shaped plastic insulator 4 which has an annular opening therethrough. If necessary, a bolt may be placed through the bracket 2 immediately above the insulator 4 to hold it in place and to prevent insulator 4 from slipping from one side of bracket 2 to the other.

As best shown in FIG. 1, the V-shaped brackets 2 support a shaft 5 which is made of an electrically conductive material. If the brackets 2 are made out of an insulative material, the shaft simply sits in and is supported by the lower portion of the bracket. If the bracket 2, however, is made out of metal or some other electrically conductive material, then the shaft 5 must be slipped through the annular opening of the cylindrical insulators 4 as shown in FIG. 2. This will prevent an electrical connection from being formed between the brackets 2 and the shaft 5.

Spaced along the length of shaft 5 are a plurality of cow trainers 10. Each trainer 10 is made out of an electrically conductive material and is attached to one end of a shaft 9 by a pair of nuts and bolts 11. Shaft 9 is also electrically conductive. The end of shaft 9 opposite the trainer 10 is secured to the shaft 5 by a locking means 6.

As best shown in FIG. 3, each of the locking means 6 is comprised of a short length pipe 7 which is made out of metal and has an inside diameter slightly larger than the outside diameter of the shaft 5. This configuration permits the pipe 7 to be slid over the shaft 5. The locking means also includes a means for attaching the shaft 9 of an individual cow trainer to the pipe 7. Typically, this will be done with a weldment where the two parts are joined. This attachment could also be accomplished by threading the end of shaft 9 and mating it with a complementary threaded hole in the pipe 7. For additional strength, it may be found desirable to provide one or more support members or gussets 8 which could be fastened to the shaft 9 and the pipe 7. Again, the preferred method of fastening would be a weldment, but those skilled in the art will recognize that other attachment means (such as screws) could be used. Finally, the locking means includes a metal pin 12, the length of which runs through holes in the pipe 7 and the shaft 5. As will be discussed in further detail below, the pin not only fixes the pipe 7 in place with respect to shaft 5, but also provides an electrical connection between these two members.

As those skilled in the art will immediately recognize, if a plurality of holes are drilled through shaft 5. Pin 12 can be used to lock the shaft 9 in a selected orientation with respect to shaft 5.

Also shown in FIG. 1 is a crank handle 13 having a cylindrical portion 14, a member 15 secured at one of its end to cylindrical portion 14, and the other end 16 being bent so as to project at approximately a 90° angle. As more clearly shown in FIG. 4, the handle 13 also includes a cylindrical insulative member 17 which surrounds the shaft 5. This insulative member 17 prevents electrical conduction between the shaft 5 and the cylindrical portion 14 of handle 13. A friction fit retains the handle 13, the insulative member 17, and shaft 5 in assembled relation with respect to each other. Thus, the insulative member 17 should have an inside diameter slightly larger than the outside diameter of shaft 5. Insulative member 17 should also have an outside diameter slightly smaller than the inside diameter of the cylindrical portion 14 of the handle 13.

To prevent wear of the parts interacting to form the friction fit between the shaft 5, the insulative member 17, and the handle 13, the members 5, 17 and 14 can be journaled and pinned together with a pin 18. Pin 18 will preferably be made out of an electrically non-conductive material so that it will not carry any current from shaft 5 to the crank handle 16.

Alternatively, the means for connecting shaft 5 and the handle 13 can be constructed in a fashion identical to those described above for securing the individual cow trainers to the shaft 5. If this alternative arrangement is used, it is important that crank handle 16 be covered with an insulative material. Use of either alternative permits the shaft 5 and the associated cow trainers 10 to rotate upon actual rotation of handle 13. Even if the user fails to disconnect the power supply 19 (which is electrically connected to the shaft 5) before he touches the handle 13, he will not receive an electric shock either because of insulative member 17 and non-conductive pin 18, and/or the insulative cover over member 16.

When in use, the force of gravity will cause the cow trainers 10 to normally assume the orientation shown in FIG. 1. However, an important feature of the present invention is the ability to simultaneously move all of the cow trainers 10 out of the position shown in FIG. 1 to a higher position above the heads of those working in the barn area. If the power supply 19 has been turned off, bumping into contact with cow trainers 10 would be a nuisance for the farmer. If the power supply 19 has not been turned off, such contact could impart a dangerous electrical shock. Thus, by rotating the handle 13, all of the cow trainers 10 can be rotated to position to at least the height of the shaft 5 which is above the expected height of personnel working in the area.

Those skilled in the art will recognize that the cow trainers 10 can be maintained in this elevated position by a wide variety of means. One typical means would include a chain attached at one of its ends of the handle 13 which is capable of having its other end attached to a hook fixed to a member of the barn. The chain would then hold the cow trainers 10 in their elevated position. Similarly, such means could include an elastic bungy cord or even a rope. In the preferred embodiment, such means will be made of a material which is not electrically conductive.

The foregoing is considered as illustrative only of the principals of the invention. Further, since numerous modifications and changes will readily occur to those skilled in the art, it is not desired to limit the invention to the exact construction and operation shown and described, in accordingly all suitable modifications and equivalents may be resorted to, falling within the scope of the invention.

I claim:

1. A cow trainer for use in a barn having stalls comprised of:
   (a) a plurality of electrically conductive training members;
   (b) an electrically conductive support shaft;
   (c) first locking means for securing said electrically conductive training members to said shaft in any one of a plurality of pre-selected angular orientations;
   (d) means for supporting said shaft above said stalls;
   (e) means for electrically insulating said support means from said shaft;
   (f) means for simultaneously rotating said shaft and the electrically conductive training members locked to it between a plurality of pre-selected positions;
   (g) second locking means for maintaining said shaft and electrically conductive training members in a desired pre-selected position; and
   (h) means for energizing said shaft and said electrically conductive training members.

2. The apparatus of claim 1 wherein said means for supporting the shaft above the stalls includes a plurality of V-shaped brackets.

3. The apparatus of claim 2 wherein said V-shaped are secured to at least one member supported by said barn.

4. The apparatus of claim 2 wherein said V-shaped brackets are electrically insulated from said electrically conductive shaft.

5. The apparatus of claim 1 wherein said means for supporting said shaft above said stalls are made of an electrically non-conductive material.

6. The apparatus of claim 1 further including means for electrically insulating said shaft from said means for supporting the shaft.

* * * * *